Nov. 7, 1967
W. J. LEIGH
3,350,724
METHOD AND APPARATUS FOR GENERATING ARTIFICIAL
WAVES IN A BODY OF WATER
Filed July 7, 1964
2 Sheets-Sheet 1
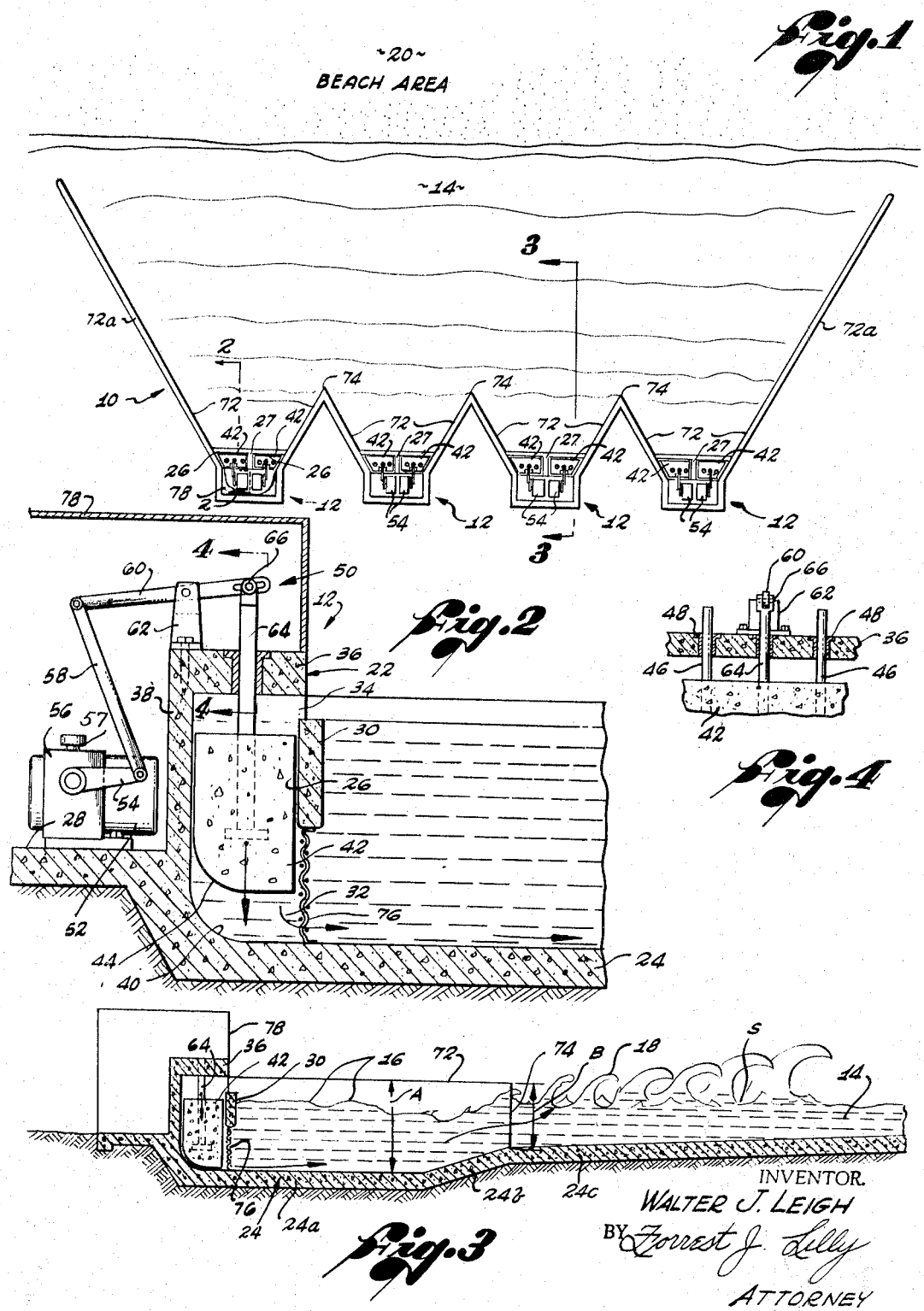
INVENTOR.
WALTER J. LEIGH
BY Forrest J. Lilly
ATTORNEY Nov. 7, 1967 W. J. LEIGH 3,350,724
METHOD AND APPARATUS FOR GENERATING ARTIFICIAL
WAVES IN A BODY OF WATER
Filed July 7, 1964 2 Sheets-Sheet 2
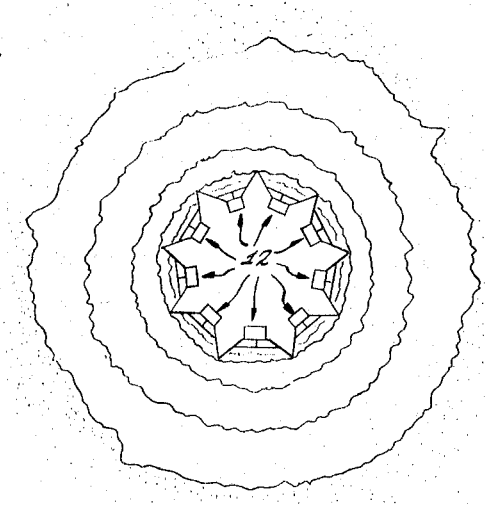
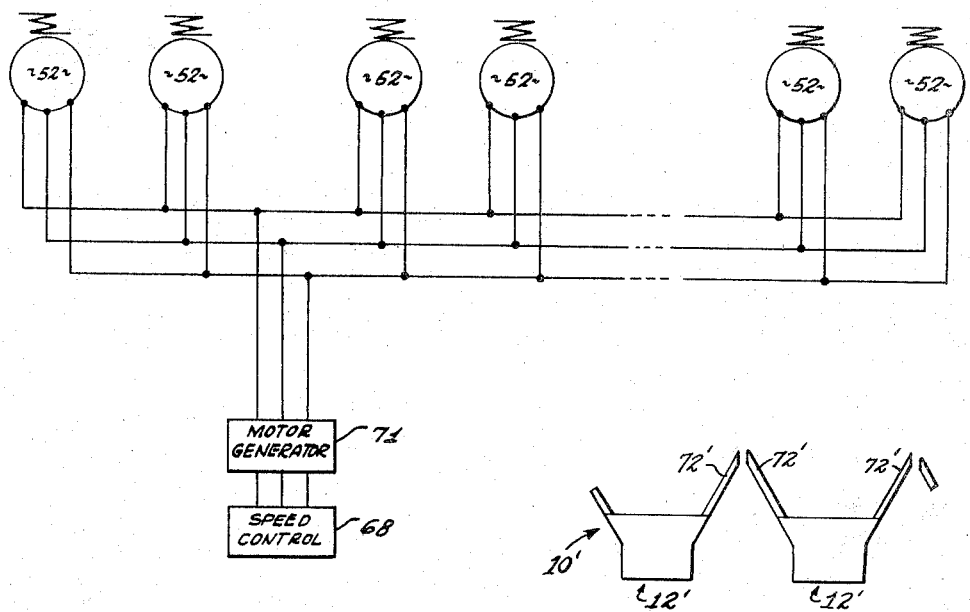
INVENTOR.
WALTER J. LEIGH
BY Forrest J. Lilly
ATTORNEY

United States Patent Office 3,350,724
Patented Nov. 7, 1967

3,350,724
METHOD AND APPARATUS FOR GENERATING ARTIFICIAL WAVES IN A BODY OF WATER
Walter J. Leigh, 8020 Birchcrest,
Downey, Calif. 90240
Filed July 7, 1964, Ser. No. 380,809
9 Claims. (Cl. 4—171)

This invention relates generally to the art of generating artificial waves and breakers in lakes, swimming pools, and the like. The invention relates, more particularly, to improved wave-generating apparatus for this purpose.

It is known in the art to generate, for the amusement of bathers, artificial waves and breakers in small bodies of water, such as swimming pools and lakes, which are devoid of natural waves and breakers. Typical existing wave-generating apparatus for this purpose are equipped with reciprocating plungers which are driven up and down in the body of water at the proper frequency to create the desired wave motion in the water. At some position in the path of the advancing wave motion, the bottom of the body of water slopes upwardly to such a depth that the base of each advancing wave strikes the bottom. When this occurs, the wave base is retarded to form a breaker in much the same way as natural breakers are formed in the ocean.

In order to be economically feasible, wave-generating apparatus of this kind must be capable of forming waves and breakers of substantial length, that is, substantial length measured normal to the direction of wave motion, so as to provide an artificial surf of sufficient area to accommodate a reasonably large number of bathers. The only way in which such wave length can be extended with the existing wave-generating apparatus is by increasing the effective length of the apparatus or by arranging several wave-generating units side by side in close proximity to one another so that they effectively provide a long continuous wave-generating apparatus. These methods of increasing wave length, however, are impractical because of the excessive power requirements, mechanical complexity, and prohibitive cost of wave-generating apparatus of sufficient effective length to form waves and breakers of a practical length.

A general object of this invention is to provide improved wave-generating apparatus of the character described which avoids the foregoing and other deficiencies of the existing wave-generating apparatus.

A more specific object of the invention is to provide improved wave-generating apparatus of the character described which is uniquely constructed and arranged to produce waves and breakers of such a length as to form an artificial surf of sufficient area to accommodate a relatively large number of bathers.

A further object of the invention is to provide wave-generating apparatus of the character described which may be arranged to create linear, arcuate, or circular waves and breakers.

Yet a further object of the invention is to provide improved wave-generating apparatus of the character described which is relatively simple in construction, economical to fabricate and operate, and is otherwise ideally suited to its intended purposes.

Other objects, advantages, and features of the invention will become evident as the description proceeds.

Briefly, the objects of the invention are attained by providing wave-generating apparatus composed of multiple wave-generating units arranged in a row extending transverse to the direction of the desired wave motion. Each unit includes a wave-generating device, such as a vertical reciprocating plunger of the type used in the existing wave-generating apparatus. During operation of the apparatus, the several wave-generating units are driven in timed relation to produce waves or wave increments which travel forwardly from the units and eventually break, thereby producing an artificial surf.

According to one important feature of the invention, the driving means for the wave-generating units are designed to be selectively operated in unison and in phase, whereby the wave increments emanating from the units travel forward in unison and merge to create long continuous waves and breakers. A second highly important feature of the invention resides in certain confining walls with which the wave-generating units are equipped to confine the wave energy produced by the respective units until the wave increments merge to form a continuous wave. Waves and breakers of maximum amplitude are thereby attained. These confining walls are uniquely constructed and arranged to permit the adjacent wave-generating units to be spaced a substantial distance apart, whereby the number of units required to produce waves of given length, and hence the complexity, cost, and power requirements of the overall wave-generating apparatus, are minimized.

According to the invention, the several wave-generating units of the present apparatus may be arranged in a straight row to form linear waves and breakers or in a curved row to form arcuate or circular waves and breakers.

A better understanding of the invention may be had from the following detailed description thereof, taken in connection with the annexed drawings, wherein:

FIG. 1 is a plan view of a wave-generating apparatus constructed in accordance with the invention;

FIG. 2 is an enlarged vertical section taken along line 2—2 in FIG. 1 and showing a removable cover in place over the wave generating mechanism;

FIG. 3 is a vertical section taken along line 3—3 in FIG. 1;

FIG. 4 is a section taken along line 4—4 in FIG. 2;

FIG. 5 is a plan view of a somewhat modified wave-generating apparatus according to the invention; and FIG. 6 diagrammatically illustrates certain electrical circuitry embodied in the present wave-generating apparatus; and FIG. 7 is a fragmgentary plan view of further wave-generating apparatus according to the invention.

The wave-generating appartus 10 illustrated in FIG. 1 is composed of separate wave-generating units 12 arranged in a row in a body of water 14, such as a lake. As will be explained later, the separate units 12 are operated in unison to form waves or wave increments 16 and breakers 18 which travel toward a beach 20. Wave-generating units 12 are identical and each includes a housing 22 which may be constructed and supported in any convenient way. According to the preferred practice of the invention, however, the housing 22 of each wave-generating unit is constructed of concrete and is integrally joined to and supported by a concrete slab 24. This slab extends forwardly from the wave-generating units toward the beach 20 along the bottom of the body of water 14 to provide a floor below the artificial surf which exists between the units and the beach. The slab is shaped in the manner illustrated best in FIG. 3 and hereinafter described in detail to induce the formation of the breakers 18. The bottom of the body of water 14 is dredged or excavated, as shown, to accommodate the slab 24.

As shown in FIGS. 1 and 2, the housing 22 of each wave-generating unit 12 contains a pair of forward chambers 26 separated by an internal partition 27 and a rear chamber or well 28. The forward wall 30 of the forward chambers 26 has lower openings 32 located a distance below the normal water level of the body of water 14 and communicating the latter to the lower ends of the forward chambers. The forward wall 30 also has upper openings 34 located approximately at the normal surface level of the body of water 14 and communicating to the upper ends of the forward chambers 26, just below the upper wall 36 of these chambers. The rear wall 38 of the forward chambers 26 and the bottom slab or floor 24 merge along a curved surface 40.

Disposed within the forward chambers 26 of each wave-generating unit 12 are vertically movable plungers 42. Plungers 42 may be constructed of any suitable material According to the preferred practice of the invention, however, the plungers are composed of concrete, as illustrated in the drawings. The rear, lower edge 44 of each plunger is rounded to complement the curved rear chamber wall portion 40. Embedded in, or otherwise rigidly fixed to, each plunger 42, adjacent its ends, are two vertical guide rods 46. These guide rods extend through and slide in bearings 48 mounted in the upper chamber wall 36. The rods 46 and bearings 48 for each plunger 42, therefore, slidably guide the latter in its vertical motion. Plungers 42 may be guided in their vertical reciprocating motion by means other than rods and bearings, of course, as by a vertically movable pantograph link arrangement.

Each wave-generating unit 12 is equipped with a mechanism 50 for driving its respective plungers 42 up and down in a vertical reciprocating motion. As will become apparent from the ensuing description, various kinds of reciprocating mechanisms, electrical, mechanical or hydraulic, may be used for this purpose. In the drawings, however, the reciprocating mechanism 50 of each wave-generating unit 12 has been illustrated as comprising a pair of synchronous motors 52 mounted side by side within the rear chamber or well 28 of the respective unit. Each motor drives a crank arm 54 through variable speed transmission 56 having means 57 for manually adjusting the speed ratio of the respective transmission. A link 58 is pivotally connected at one end to the outer end of each crank arm 54. The other end of each link 58 is pivotally attached to one end of a walking beam 60. The two walking beams 60 of each wave-generating unit 12 are rockably supported, intermediate their ends, on upstanding fulcrum supports 62 mounted on the upper chamber wall 36. The other ends of the walking beams 60 are situated over the plungers 42, respectively, approximately in line with the centers of the respective plungers. Embedded in, or otherwise rigidly secured to, each plunger 42 is a rod 64 which extends upwardly, through an opening in the upper chamber wall 36 to the overlying end of the respective walking beam 60. Each walking beam is pivotally secured to its respective plunger rod 64 by a pin and slot connection 66. Each motor 52 is thereby effective to drive its respective plunger 42 in a vertical reciprocating motion.

As shown in FIG. 6, the several plunger drive motors 52 are connected in electrical parallel to a common electrical A.C. power supply 71. This power supply is shown to be a motor-generator set comprising an A.C. generator which supplies alternating current to the synchronous motors 52 and a variable speed motor for driving the generator. The motor speed of the motor-generator set is adjusted by a controller 68, thereby to vary the frequency of the alternating current delivered to the motors 52. Since the motors 52 are synchronous motors and energized from a common A.C. generator, the shafts of the latter motors rotate in unison and at a speed determined by the frequency of the energizing current supplied to the motors. Adjusting the controller 68 to vary the frequency of the energizing current, therefore, simultaneously varies the speed of all the motors 52 and hence the rate of reciprocation of all the plungers 42. The rate of reciprocation of any one or more of the plungers 42 may be independently varied by adjusting the speed ratio of the corresponding transmission or transmissions 56.

In the most common mode of operation of the wave-generating apparatus 10, the several variable speed transmissions 56 are set so that the plungers 42 of the wave-generating units 12 are vertically reciprocated in unison and in phase, whereby all of the plungers rise and fall simultaneously. During each upstroke of each plunger, water flows into the corresponding plunger chamber 26, below the plunger, through the respective lower chamber opening 32. During each down-stroke of each plunger, water is expelled from the corresponding chamber 26 through the lower chamber opening 32. This pulsating action of each plunger generates, in the body of water 14, the waves, or wave increments, 16 which travel forwardly toward the beach 20 in unison and in phase.

As noted earlier, wave-generating apparatus for the purposed described, if it is to be economically feasible, must be capable of producing waves of substantial length, that is, substantial length measured along the waves normal to their direction of motion, so as to create an artificial surf of sufficient area to accommodate a reasonable number of bathers. For example, wave lengths of 100 yards, or more, may be required for such economic feasibility. As noted earlier, the existing wave-generating apparatus are ill-suited to, and economically incapable of, generating waves of this length.

The present wave-generating apparatus 10, on the other hand, is uniquely constructed to permit waves having a wave length on the order of that mentioned above, or greater, to be economically produced. To this end, each wave-generating unit 12 is equipped with walls 72 which rise from the slab or floor 24 and extend forwardly from the respective unit toward the beach 20. These walls rise above the normal surface level of the body of water 14 a distance which is somewhat greater than the crest height of the wave increments 16, for reasons which will become apparent shortly. As shown in FIG. 1, the walls 72 of each wave-generating unit are inclined at equal acute angles relative to, and in opposite directions from, a fore and aft vertical plane of symmetry of the respective unit, whereby the walls diverge as they approach the beach 20. The adjacent walls of adjacent wave-generating units converge as they approach the beach 20, and the forward ends of these latter walls are preferably joined along relatively sharp meeting edges 74. As will appear from the ensuing description, however, operation of the present wave-generating apparatus does not require actual joining of the forward ends of the adjacent walls 72 of the adjacent wave-generating units 12. In this regard, attention is directed to FIG. 7 which illustrates a modified wave-generating apparatus 10' according to the invention in which the forward ends of the walls 72' of adjacent wave-generating units 12' are disposed in close proximity to one another but are not physically joined to one another. According to the preferred practice of the invention, the outer walls 72a of the two end units 12 extend a substantially greater distance toward the beach 20 than the intervening walls 72.

During operation of the wave-generating apparatus 10, the waves, or wave increments, 16 emanating from each wave-generating unit 12 of the apparatus travel forwardly between the respective walls 72. These walls confine the wave increments in the endwise direction in such manner as to permit progressive expansion of the waves until the latter pass the sharp meeting edges 74 of the walls. Assuming that the several wave-generating units operate in unison and in phase, as explained earlier, the corresponding wave increments from the several units advance forwardly in unison and in phase and thus merge end to end as they pass the meeting edges 74 of the wave confining walls, thereby forming one long continuous wave. The long outer walls 72a of the two end units 12 confine these longer waves as the latter travel toward the beach 20.

At this point, it is apparent that the confining walls 72 and 72a of the wave-generating units 12 serve two highly important functions. First, the walls 72 permit progressive longitudinal expansion of the wave increments 16 as the latter travel forwardly to merge just beyond the meeting edges 74 of the walls. As a result, the length of the waves created by merging of the wave increments 16 is substantially greater than the combined length of the several wave-generating plungers 42 which produce the waves.

Accordingly, each wave-generating unit 12 may be made relatively small and the adjacent units may be spaced a substantial distance apart, whereby the cost, complexity, and power requirements of a present wave-generating apparatus, capable of generating waves of a practical length (i.e., 100 yards or more), are drastically reduced relative to those of existing wave-generating apparatus capable of producing the same wave length. The reduction in cost, complexity, and power requirements achieved by the present invention are, in fact, sufficient to render the present wave-generating apparatus completely economically feasible.

Secondly, the walls 72 and 72a of the wave-generating units 12 control and minimize the wave energy which is dissipated by longitudinal expansion of the wave increments 16 emanating from each unit and concentrate or focus the wave energy in a forward direction. As a result, the wave increments 16 from the several units possess maximum amplitude as they merge, whereby the longer continuous waves resulting from merging of the wave increments also possess maximum amplitude.

It will be immediately apparent to those skilled in the art that the present wave-generating apparatus 10 may be installed in a body of water having a depth, between the apparatus and the beach 20, which is sufficient to preclude the formation of breakers. In this case, the long continuous waves produced by merging of the wave increments 16 emanating from the several wave-generating units 12 will simply travel to the beach without breaking. According to the preferred practice of the invention, however, the slab or floor 24, or the bottom of the body of water 14, if such concrete slab is omitted, is contoured to cause the waves to break in the area between the apparatus and the breach, and thereby form an artificial surf in this area. The manner in which waves traveling through water are induced to form breakers is well understood in the art and, accordingly, need not be treated in detail. Suffice it to say that a breaker is formed when the base of a wave traveling through a body of water impinges the bottom or floor of the body. When this occurs, the motion of the wave base relative to the wave crest is retarded and the crest of the wave advances relative to the base until the latter is no longer capable of vertically supporting the crest. The water at the crest of the wave then spills over, as it were, the wave front; that is to say, the wave breaks.

In order to include the formation of breakers, the slab 24 is formed with a generally horizontal leading portion 24a which extends forwardly a distance from the base of the wave-generating units 12, an intermediate ramp portion 24b which slopes upwardly at a relatively steep angle from the forward edge of the leading slab portion 24a, and a trailing portion 24c which extends from the forward edge of the ramp portion 24b to the beach 20 and slopes upwardly at a small angle substantially less than the slope angle of the ramp 24b. The depth A of the leading slab portion 24a below the normal surface level S of the body of water 14 is made somewhat greater than the depth of the base of the waves of greatest amplitude to be generated by the apparatus 10. As is well known in the art, this wave base is equal to the wave length measured between the crests of two adjacent advancing waves. The depth B of the forward edge of the ramp 24b below the surface level S, on the other hand, is made substantially less than some arbitrarily selected minimum wave base depth. From this description, it is apparent that the motion of the wave increments 16 emanating from each of the wave-generating units 12 is unobstructed during forward motion of the increments over the leading slab portion 24a. Shortly after each wave increment travels beyond the forward edge of the slab portion 24a, the wave base strikes the inclined ramp 24b, whereupon the forward motion of the wave base relative to the wave crest is retarded and the wave is caused to break in the manner described earlier. This retarding of the wave base relative to the wave crest continues as the wave travels forwardly over the trailing slab portion 24c, whereby the breaker-forming action continues from the ramp 24b to the beach 20. FIG. 3 illustrates breakers which have been formed in this way.

A highly unique and important feature of the invention resides in the fact that the forward meeting edges 74 of the wave confining walls 72 are located approximately in line with the inclined breaker including ramp 24b. This arrangement is highly advantageous for the reason that the wave energy emanating from the units 12 continues to be confined and concentrated by the walls 72 until the wave increments 16 are induced to break by forward motion over the ramp 24b. As the resulting breakers, or breaker increments, travel forwardly beyond the meeting edges 74 of the walls, they merge to form long continuous breakers which continue to travel forwardly toward the beach 20. In this way, the wave energy is concentrated by the walls until the breakers are formed, whereby breakers of maximum amplitude are attained.

When starting the present wave-generating apparatus 10, the relative speeds and positions of the plungers 42 are adjusted by adjustment of the variable speed transmissions 56 and the motor speed of the motor-generator set 71 until the plungers are reciprocating at the desired speeds and in the desired phase relation. As mentioned earlier, in the most common mode of operation of the apparatus, the plungers reciprocate in unison and in phase, whereby the wave increments 16 emanating from wave-generating units 12 merge to form long continuous waves and breakers. It is possible, however, to drive the plungers in other phase relations, to attain varied wave patterns, by suitable adjustment of the transmissions 56.

The front walls 30 of the plunger chambers 26 serve a threefold purpose. They confine the water in the chambers, whereby the wave-generating action of the plungers is optimized. Further the walls 30 minimize the lateral thrust of waves against the plungers and thereby prevent damage to the plungers. Finally, the walls 30 shield the plungers to prevent injury to bathers. For this latter reason, a wire mesh or screen 76 may be placed across the large lower chamber openings 32 and the reciprocating mechanism 50 of each wave-generating unit 12 may be enclosed in a housing 78.

It will be immediately apparent to those skilled in the art that the units 12 of the present wave-generating apparatus 10 may be arranged other than in a linear row. The row of wave-generating units may be shaped to follow the general outline of the beach 20, for example. Thus, the row of units may be curved to follow the outline of a curved beach. FIG. 5 illustrates another possible alternative arrangement of the present wave-generating apparatus. In this later apparatus, the wave-generating units 12 are arranged in a circular row, whereby the apparatus is uniquely adapted for installation at the center of a lake or other body of water. It is to be noted that with the circular arrangement of FIG. 5, the long outer walls 72a which are embodied in the wave-generating apparatus 10 of FIG. 1 are unnecessary and, therefore, omitted. The present invention may, of course, be embodied in wave-generating apparatus for swimming pools, as well as lakes, and, in fact, may be utilized in a toy equipped with a container for water, a mechanism for generating small waves in the water, and simulated surf riders, for example.

It is apparent that the invention herein described and illustrated is fully capable of attaining the several objects and advantages preliminarily set forth.

While certain presently preferred embodiments of the invention have been disclosed for illustrative purposes, various modifications in the design, arrangement of parts, and instrumentalities of the invention are obviously possible within the spirit and scope of the following claims.

I claim:

1. Apparatus for generating waves in a body of water, comprising:

a pair of spaced, normally upright walls to be placed in said body of water, said walls being vertically dimensioned to project a distance above the water surface, a wave-generating unit including wave-generating means between said walls adjacent one end thereof for generating in said water a wave motion which travels outwardly from said generating means between said walls, whereby said walls confine said wave motion in the lengthwise direction of the waves thereof, and said walls being flat and diverging at a constant angle in the direction of travel of said wave motion.

2. Apparatus for generating waves in a body of water, comprising:

a pair of wave-generating units to be placed in said body of water, each unit including a pair of normally upright walls which are vertically dimensioned to project a distance above the water surface, wave-generating means between said walls adjacent one end thereof for generating in said water a wave motion which travels outwardly from said generating means between said walls, whereby said walls confine said wave motion in the lengthwise direction of the waves thereof, said walls diverging in the direction of travel of the wave motion, said units being arranged side by side with the adjacent walls of the two units converging toward the opposite ends of said adjacent walls and with said opposite wall ends disposed in close proximity to one another, and means for operating said wave-generating means in timed relation.

3. Apparatus for generating waves in a body of water, comprising:

a plurality of wave-generating units to be placed in said body of water, each unit including a pair of normally upright walls which are vertically dimensioned to project a distance above the water surface, wave-generating means between said walls adjacent one end thereof for generating in said water a wave motion which travels outwardly from said generating means between said walls, whereby said walls confine said wave motion in the lengthwise direction of the waves thereof, said walls diverging in the direction of travel of the wave motion, said units being arranged in a row with adjacent units spaced lengthwise of said row and with the adjacent walls of adjacent units converging toward the opposite ends of said adjacent walls, said opposite ends of each pair of adjacent walls being joined along relatively sharp meeting edges, and means for operating said wave-generating means in timed relation.

4. Wave-generating apparatus according to claim 3 wherein:

said units are arranged in a closed curved row.

5. Wave-generating apparatus according to claim 3 wherein:

said units are arranged in a generally circular row.

6. Wave-generating apparatus according to claim 2 wherein:

said operating means includes means for operating said wave-generating means in unison and in phase, whereby waves generated by said generating means travel outwardly in unison and merge end to end to form longer waves as the waves emerge from between the walls.

7. Wave-generating apparatus according to claim 3 including:

means extending between said opposite ends of said walls adjacent the normally lower edges of the walls for inducing the waves generated by said wave-generating means to form breakers as the waves emerge from between the walls.

8. In combination with a body of water, a plurality of wave-generating units positioned in said body of water, each unit including a pair of normally upright walls having their upper edges located a distance above the normal surface level of the water, and wave-generating means between said walls adjacent one end thereof for generating in said water a wave motion which travels outwardly from said generating means between said walls, whereby said walls confine said wave motion in the lengthwise direction of the waves thereof, said walls diverging in the direction of travel of the wave motion, said units being arranged in a row with adjacent units spaced lengthwise of said row and with the adjacent walls of adjacent units converging toward the opposite ends of the latter walls, said opposite ends of each pair of adjacent walls being disposed in close proximity to one another, the depth of said body of water being greater than the wave base depth of said waves throughout at least the major length of said walls from said wave-generating means, said body of water having a floor which slopes upwardly adjacent said opposite ends of the walls to a depth less than said wave base depth, whereby the waves are induced to form breakers as they emerge from between said walls, and means for operating said wave-generating means in timed relation.

9. The combination according to claim 8 wherein:

said operating means includes means for operating said wave-generating means in unison and in phase, whereby said breakers merge end to end to form longer continuous breakers as they emerge from between said walls.

References Cited

UNITED STATES PATENTS 2,002,043    5/1935    Price _____ 74—40 X

FOREIGN PATENTS 175,937    6/1935    Switzerland.

LAVERNE D. GEIGER, *Primary Examiner.*

B. E. KILE, *Assistant Examiner.*